United States Patent
Chawki et al.

[11] Patent Number: 5,726,785
[45] Date of Patent: Mar. 10, 1998

[54] OPTICAL ADD-DROP MULTIPLEXER USING OPTICAL CIRCULATORS AND PHOTOINDUCED BRAGG GRATINGS

[75] Inventors: Mouhammad Jamil Chawki, Lannion; Eric Delevaque, Pourilliau; Valérie Tholey, Lannion, all of France

[73] Assignee: France Telecom, Paris, France

[21] Appl. No.: 604,417

[22] Filed: Feb. 21, 1996

[30] Foreign Application Priority Data

Feb. 28, 1995 [FR] France .................. 95 02303

[51] Int. Cl.$^6$ .................................................. H04J 14/02
[52] U.S. Cl. .................................................. 359/130
[58] Field of Search .................. 359/125, 127, 359/129, 130

[56] References Cited

U.S. PATENT DOCUMENTS

| | | | |
|---|---|---|---|
| 4,953,939 | 9/1990 | Epworth | 359/173 |
| 5,479,082 | 12/1995 | Calvani et al. | 359/125 |
| 5,557,442 | 9/1996 | Huber | 359/161 |

OTHER PUBLICATIONS

Jones et al, "Optical wavelength add-drop multiplexer in installed submarine WDM network", Electronic Letters, vol. 31, No. 24, pp. 2117–2118, Nov. 1995.

Giles et al, "Low Loss Add/Drop multiplexer for WDM Lightwave Networks", Conference on Integrated Optics an Optical Fibre Communication, Technical Digest, pp. 66–67, Jun. 1995.

Kersey, "Spectrally Selective Fiber transmission Filter System", Licensing offer, received Jul. 1994, US patent application 154419, Jul. 1994.

*Primary Examiner*—Leslie Pascal
*Attorney, Agent, or Firm*—Pearne, Gordon, McCoy & Granger LLP

[57] ABSTRACT

This multiplexer adds to a group of optical signals, whose wavelengths belong to a group of wavelengths ($\lambda 1 \ldots \lambda N$) and drop from said group of signals at least one optical signal having a given wavelength, chosen from within the wavelength group and comprises at least one optical circulator (C1, C2) having an input for receiving the group of signals and an output, an optical selection means (MS) coupled, on one side, to the circulator and which comprises at least one photoinduced Bragg grating (R1 . . . RN), said photoinduced Bragg grating being associated with the given wavelength and which can be in a first state, where it reflects the signal having said given wavelength and where it transits signals having a wavelength different from the given wavelength or optionally in a second state where it transmits all the signals, and a means (MC) for the control of said selection means (MS) for placing the grating in said second state, the selection means cooperating with each optical circulator for adding and dropping the optical signal or signals. Application to optical telecommunications.

18 Claims, 3 Drawing Sheets

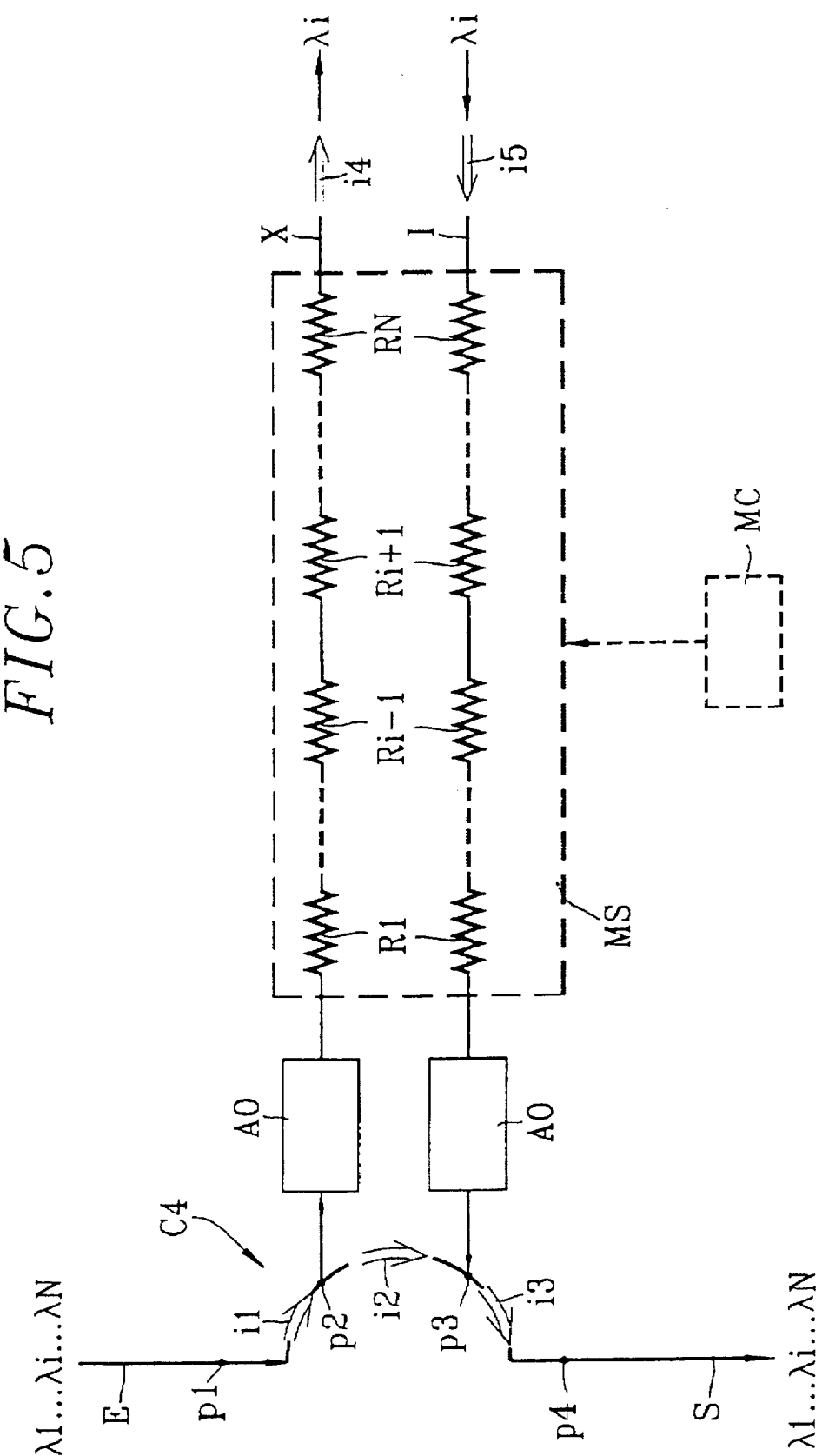

OPTICAL ADD-DROP MULTIPLEXER USING OPTICAL CIRCULATORS AND PHOTOINDUCED BRAGG GRATINGS

TECHNICAL FIELD

The present invention relates to an optical add-drop multiplexer. It more particularly applies to the field of optical telecommunications.

PRIOR ART

Various telecommunication network architectures are known using optical guides and optical add-drop multiplexers based on acousto-optical filters or Fabry-Pérot filters.

These known add-drop multiplexers suffer from the disadvantage of leading to high optical losses both on adding and on dropping.

DESCRIPTION OF THE INVENTION

The object of the present invention is to obviate this disadvantage by proposing an add-drop multiplexer leading to optical losses lower than those of the known multiplexers.

In certain embodiments, the invention makes it possible to amplify the optical signals which are added and also those which are dropped and/or provide a programmable multiplexer.

More specifically, the present invention relates to an optical add-drop multiplexer, which serves to add to a group of optical signals, whose wavelengths belong to a group of wavelengths and drop from said group of signals at least one optical signal having a given wavelength, chosen from within the wavelength group, said multiplexer being characterized in that it comprises:

- at least one optical circulator having an input for receiving the group of signals and an output,
- an optical selection means coupled, on one side, to the circulator and which comprises at least one photoinduced Bragg grating, which is associated with the given wavelength and which can be in a first state, where it reflects the signal having said given wavelength and where it transmits the signals having a wavelength different from the latter or optionally in a second state, where it transmits all the signals and
- a means for controlling said selection means for placing the grating in the second state,
- the selection means cooperating with each optical circulator for adding and dropping the optical signal or signals.

In the invention, when each photoinduced Bragg grating is intended to remain in its first state, which is its normal state, there is no control means.

According to a first embodiment, the multiplexer according to the invention comprises:

- a first optical circulator having an input for receiving the group of signals and an output,
- a second optical circulator having an input for receiving the signal to be added to the group of signals and an output,
- an optical selection means coupled, on one side, to the first circulator and, on the other side, to the second circulator and which comprises at least one photoinduced Bragg grating, which is associated with the given wavelength and can be in a first state, where it reflects the signal having said given wavelength and where it transmits the signals having a wavelength different from the latter, or optionally in a second state, where it transmits all the signals and
- a means for controlling said selection means for placing the grating in the second state, the output of the second circulator supplying the group of signals in which has been added or from which has been dropped the signal having the given wavelength and the output of the first circulator supplying the signal dropped from said group of signals when the grating is in the first state and conversely when the grating is in the second state.

The optical selection means can then comprise a plurality of photoinduced Bragg gratings, which are connected in series and each of which is in the first stage (there then being no means for controlling the selection means).

According to a first variant corresponding to the first embodiment, the optical selection means comprises a plurality of photoinduced Bragg gratings, which are connected in series and the control means can place each of the gratings in the second corresponding state.

Thus, a programmable multiplexer is obtained making it possible to select the wavelength or wavelengths to be added and dropped.

In the case of this preferred variant, the photoinduced Bragg gratings of the optical selection means can be respectively associated with the wavelengths of the wavelength group.

At least one optical amplifying medium can be placed between the optical selection means and one of the first and second circulators. It is also possible to place two optical amplifying means between the optical selection means and respectively the first and second circulators.

In a first constructional variant, at least one of the photoinduced Bragg gratings is placed in the first corresponding state, whilst each of the other gratings is placed in the second corresponding state.

In a second constructional variant, at least one of the photoinduced Bragg gratings is placed in the second corresponding state, whilst each of the other gratings is placed in the first corresponding state.

In this case, the multiplexer according to the invention can also comprise at least one optical amplifying medium, which is placed between the optical selection means and the first circulator.

Each of the first and second optical circulators can comprise a first optical isolator and a second optical isolator, the input of the first isolator and the output of the second isolator being respectively coupled to the input and the output of the corresponding circulator, whilst the output of the first isolator and the input of the second isolator are coupled to the optical selection means.

According to a second embodiment, the circulator has four ports, the first and fourth ports respectively forming the input and output of the circulator, whilst the second and third ports are coupled to the optical selection means, the latter having a first array of M photoinduced Bragg gratings, which are connected in series and respectively associated with wavelengths different from the wavelength group, said first array being coupled to the second port, with $1 \leq M < N$, and a second array, identical to the first is coupled to the third port.

In this case, the multiplexer can also comprise at least one optical amplifier connected in series with at least one of the first and second arrays, or each of the first and second arrays can be connected in series with at least one optical amplifier. M can be equal to $N-1$.

In the case of this second special embodiment, each grating can be in its first state or the multiplexer can comprise the control means making it possible to place each grating in its second state.

BRIEF DESCRIPTION OF THE DRAWINGS

The invention is described in greater detail hereinafter relative to non-limitative embodiments and the attached drawings, wherein show:

FIG. 5 A diagrammatic view of another special embodiment of this multiplexer using an optical circulator with four ports.

DETAILED DESCRIPTION OF EMBODIMENTS

Figure 1:
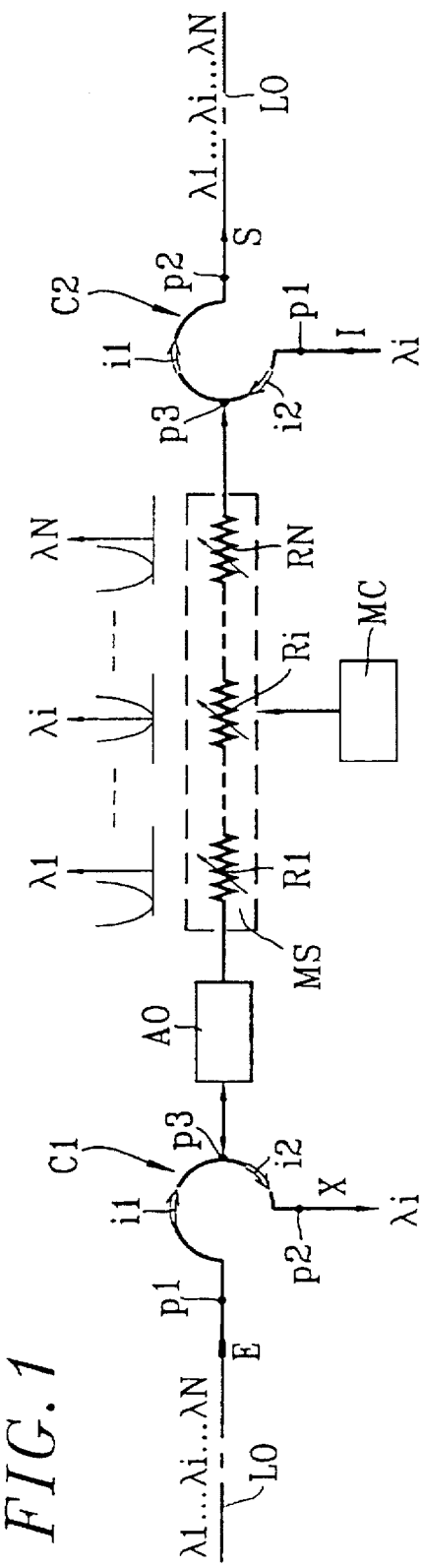
FIGS. 1 to 4 Diagrammatic views of special embodiments of the optical add-drop multiplexer according to the invention, using two optical circularors having three ports.

The optical add-drop multiplexer according to the invention and which is diagrammatically shown in FIG. 1 is used for adding to a group of optical signals and dropping from said group of signals, optical signals having given wavelengths.

The wavelengths of the optical signals in question belong to a group of wavelengths $\lambda 1 \ldots \lambda i \ldots \lambda N$, in which N is an integer higher than 1.

The aim is e.g. to add and/or drop a signal, whose wavelength is chosen from within the wavelength group $\lambda 1 \ldots \lambda N$ and is e.g. $\lambda i$, in which $1 \leq i \leq N$.

The multiplexer shown in FIG. 1 is added in an optical line LO e.g. forming an optical loop in which is located other, not shown, optical multiplexers, identical to that of FIG. 1 and positioned upstream and downstream thereof on the optical line LO. Signals of wavelengths $\lambda 1 \ldots \lambda i \ldots \lambda N$ pass through said line.

The optical multiplexer according to the invention, shown in FIG. 1, comprises:

a first optical circular C1 having an input port p1, which receives the group of signals, and an output port p2, a second optical circulator C2 having an input port p1, which receives the signal to be added to the group of signals, and an output port p2, an optical selection means MS optically coupled, on one side, to the first circulator C1 and, on the other side, to the second circulator C2 and which comprises a plurality of photoinduced Bragg gratings R1 ... Ri ... RN, which are connected in series and respectively associated with the wavelengths $\lambda 1 \ldots \lambda i \ldots \lambda N$, and a means MC for electrically controlling said selection means MS.

Each of the gratings R1 ... Ri ... RN can be:

either in a first state, namely the natural state, in which it is "tuned", i.e. set, to the corresponding wavelength, or in a second state, in which it is not set to said wavelength.

In the first state, said grating reflects the incident optical signals having the wavelength on which it is set and transmits the optical signals not having this wavelength. In the second state, said grating transmits the incident optical signals, no matter what the wavelength thereof.

Such a grating, which is induced on an optical guide, e.g. an optical fibre or a planar guide (e.g. of silicon, InP or lithium niobate), functions in transmission as a rejection filter and in reflection as a band-pass filter.

The gratings R1 ... RN of the multiplexer of FIG. 1 are programmable. Thus, each of them may or may not be set to the wavelength corresponding thereto.

Photoinduced Bragg gratings are known, whose rejection or suppression ratio reaches 99% (20 dB).

The control means MC is able to selectively place each of the gratings R1 ... RN in the second corresponding state. To do this, said control means MC comprises means for applying a mechanical stress (piezoelectric devices) or a thermal heating (Peltier effect devices) to each of the gratings R1 ... RN.

The application of such a mechanical stress or thermal heating to a photo-induced Bragg grating makes it possible to obtain a tunability of a few nanometers by electrical control.

Therefore, each grating can be set (the piezoelectric device or corresponding Peltier effect device being deactivated) or not set (the device being activated) to the wavelength associated therewith.

Consideration will now be given to the optical circulators C1 and C2.

It is pointed out that an optical circulator is an optical coupling system, which is generally formed from optical fibres, which is independent of the polarization and which has a low adding or insertion loss of approximately 1 dB. This optical coupling system uses optical isolation.

In the example shown in FIG. 1, each of the optical circulators C1 and C2 has three optical ports, namely the aforementioned ports p1 and p2 and another port p3.

The port p1 of the circulator C1 is connected to the line LO and corresponds to the input E of the multiplexer. The port p2 of the circulator C1 corresponds to the drop output X of the multipier. The port p1 of the circulator C2 corresponds to the add input I of said multiplexer. The port p2 of the circulator C2 is connected to the line LO and corresponds to the output S of the multiplexer.

Each of the circulators C1 and C2 comprises a first optical isolator i1 and a second optical isolator i2. The input of the isolator i1 and the output of the isolator i2 are respectively coupled to the port p1 and the port p2, as can be seen in FIG. 1. The output of the isolator i1 and the input of the isolator i2 are optically coupled to the port p3.

Port p3 is itself optically coupled to the optical selection means M3 and more specifically to the photoinduced Bragg grating R1, as can be seen in FIG. 1.

In the example shown in FIG. 1, the coupling between the port p3 and the grating R1 takes place by means of a bidirectional, optical amplifying medium AO, which is e.g. a fibre optic amplifying medium or a semiconductor amplifying medium.

An optical signal entering the circulator C1 by its port p3 is completely transmitted to the port p2 of said circulator C1.

The ports p1 and p3 are entirely isolated from one another, the isolation exceeding 30 dB. The port p3 of the circulator C2 is optically coupled to the photoinduced Bragg grating RN.

The N programmable gratings R1 ... RN determine the wavelength or wavelengths to be dropped from the port p2 of the circulator C1 as a function of the frequency positions of these gratings.

In the example shown, the signal of wavelength $\lambda i$ is dropped from signals reaching the input E of the optical multiplexer and a signal of wavelength $\lambda i$ is also added to said signals. To do this, the grating Ri is set to said wavelength $\lambda i$.

However, the other gratings R1 ... Ri–1, Ri+1 ... RN are not set to the wavelengths corresponding thereto. Thus, all the input signals whose wavelengths are different from i pass from the input E to the output S of the optical multiplexer.

A signal of wavelength $\lambda i$, which enters said multiplexer, is reflected by the photoinduced grating Ri and returns to the circulator C1, leaving the latter by the drop output X, where it can be processed by appropriate, not shown means.

A signal of wavelength $\lambda i$ from a not shown source and entering the multiplexer by the add input I thereof reaches the grating Ri, is reflected by the latter and passes out of the multiplexer by its output S.

The bidirectional amplifying medium AO permits the single amplification of the optical signals passing through the multiplexer of FIG. 1 and the double amplification of a signal dropped from said signals, an added signal not being amplified.

In a not shown embodiment, the optical amplifying medium AO is placed between the grating RN and the circulator C2 instead of between the circulator C1 and the grating R1.

In this case, the amplifying medium permits the single amplification of the signals passing through the multiplexer and the double amplification of an added signal, a dropped signal not being amplified.

It should be noted that the circulators C1 and C2 ensure the isolation of the amplifying medium AO with respect to optical reflections. It is consequently unnecessary to add optical isolators to the multiplexer of FIG. 1 in order to obtain said isolation.

To increase the optical amplification of the signals, two optical amplifying media can be used in place of one, one being placed between the circulator C1 and the grating R1 and the other between the grating RN and the circulator C2. For stability reasons, it is preferable for the optical amplifying medium or media to have a stabilized gain.

In a not shown embodiment, a plurality of gratings R1 . . . RN are set to corresponding wavelengths, which is not the case with the other gratings.

For example, the gratings R1 and RN are set to the corresponding wavelengths $\lambda 1$ and $\lambda N$ and the other gratings R2 . . . RN−1 are not set to the wavelengths $\lambda 2$ . . . $\lambda N-1$.

Under these conditions, it is possible to add to the signals reaching the multiplexer input, signals of respective wavelengths $\lambda 1$ and $\lambda N$ and it is also possible to drop therefrom such signals of respective wavelengths $\lambda 1$ and $\lambda N$.

In another not shown embodiment, the multiplexer only comprises a single photoinduced Bragg grating, which is set to the corresponding wavelength (and which is therefore in its normal state) without having any need for a control means.

In this case, it is possible to add to the incident signals and/or drop therefrom, a signal having said wavelength.

Consideration will now be given to the multiplexer according to the invention and which is diagrammatically shown in FIG. 2. The input E and output S of said multiplexer are on the same optical circulator, namely C1.

Figure 2:
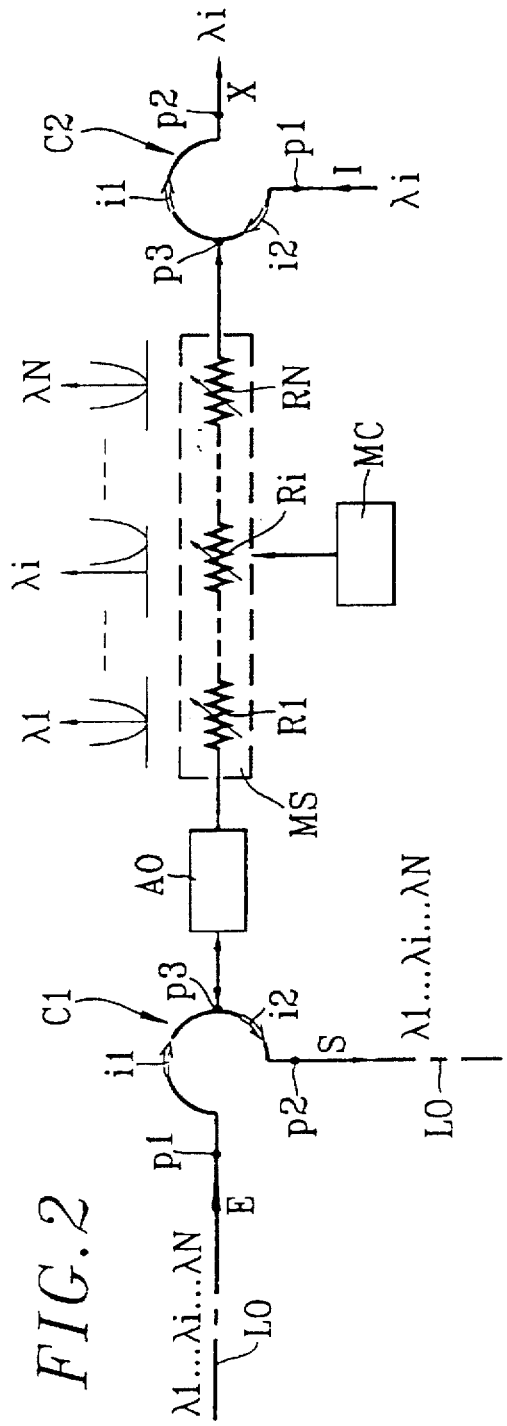

FIG. 2 also shows the two portions of the optical line LO, to which are respectively connected the multiplexer input E and output S. The add-drop function is implemented with the aid of a second circulator, namely C2.

More specifically, the multiplexer of FIG. 2 is formed in the same way as that of FIG. 1, except that the setting of the photoinduced Bragg gratings is different.

In the chosen example, where it is wished to add a signal of wavelength $\lambda i$ to the incident signals and/or drop therefrom a signal of wavelength $\lambda i$, all the gratings forming part of the selection means MS of the multiplexer of FIG. 2 are set to corresponding wavelengths, with the exception of the photoinduced grating Ri corresponding to the wavelength $\lambda i$, which is not set to said wavelength $\lambda i$.

Under these conditions, the input port p1 and output port p2 of the circulator C1 of the multiplexer of FIG. 2 correspond respectively to the input E and the output S of the multiplexer of FIG. 2.

The input port p1 and output port p2 of the circulator C2 of the multiplexer of FIG. 2 respectively correspond to the add input I and the drop output X of the multiplexer of FIG. 2.

The optical signals, whose wavelengths belong to the group $\lambda 1$ . . . $\lambda N$, but different from $\lambda i$, arrive at the input E of the multiplexer and then pass into the circulator C1 in order to arrive at the selection means MS, where they are reflected by the corresponding photoinduced gratings. These signals then pass to the multiplexer output S, again passing through the circulator C1.

An optical signal of wavelength $\lambda i$ injected at the input I passes through all the gratings R1 . . . RN and also arrives at the output S.

An optical signal of wavelength $\lambda i$ arriving through the input E of the multiplexer of FIG. 2 passes through all the gratings thereof, then into the circulator C2 and finally to the drop output X.

Instead of a single grating not being set to the corresponding wavelength, it would be possible not to set a plurality of gratings on the corresponding wavelengths in order to be able to add and/or drop optical signals having these wavelengths.

In the example of FIG. 2, the bidirectional, optical amplifying medium AO is again added between the port p3 of the circulator C1 and the grating R1.

Under these conditions, the signals which do not correspond to a drop wavelength and which reach the input E arrive at the output S after having been twice amplified by said amplifying medium AO. Moreover, any signal to be added undergoes a single amplification on the part of this amplifying medium AO and this also applies to any signal to be dropped.

It would obviously be possible to place another bidirectional, optical amplifying medium between the grating RN and the circulator C2 of the multiplexer of FIG. 2. It would also be possible to use a single optical amplifying medium which would be placed between the grating RN and the circulator C2. In this case, only the signals to be dropped and the signals to be added would be amplified.

It is possible to implement a multiplexer according to the invention comparable to that of FIG. 1, but which comprises one or a plurality of photoinduced Bragg gratings which remain "fixed", i.e. in their first state (natural state) and which consequently require no control means. With such a multiplexer, it is possible to add and/or drop the wavelength or wavelengths corresponding to said grating or gratings.

Figure 3:
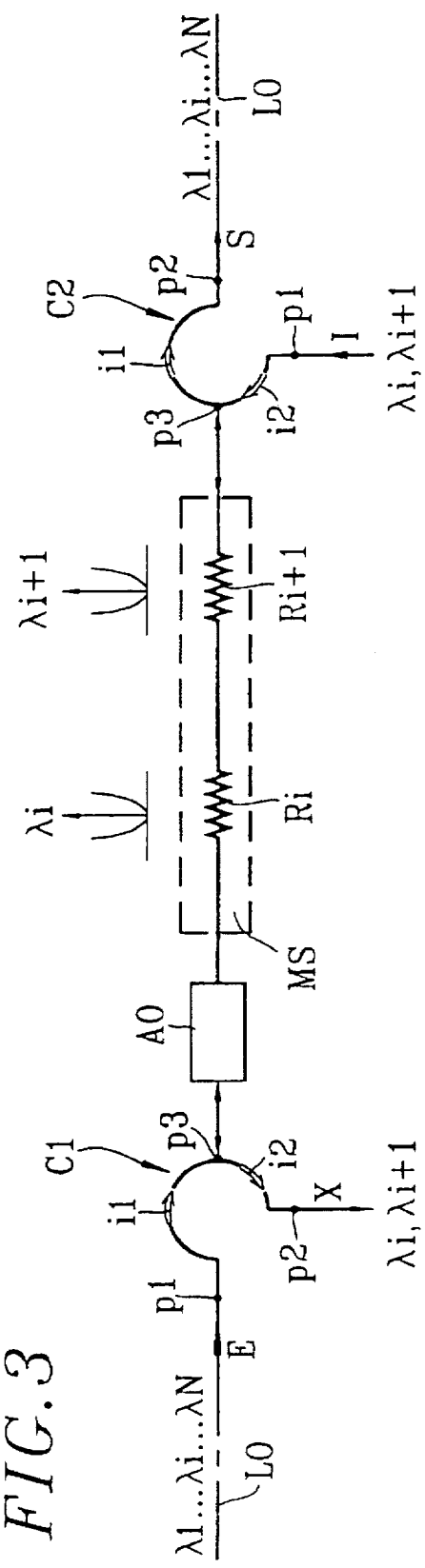

This is diagrammatically illustrated in FIG. 3 showing a multiplexer according to the invention, identical to that of FIG. 1, except with regards to the selection means which, in the case of FIG. 3, only comprises the gratings Ri and Ri+1, which are connected in series and always remain in the first state (there is no control means MC). This multiplexer of FIG. 3 makes it possible to add and/or drop signals of wavelengths $\lambda i$ and $\lambda i+1$.

It is also possible to implement a multiplexer according to the invention comparable to that of FIG. 2, but which comprises one or a plurality of photoinduced Bragg gratings which remain "fixed", i.e. in their first state (natural state) and which consequently requires no control means. With this multiplexer it is possible to add and/or drop remaining wavelengths not reflected by the grating or gratings.

Figure 4:
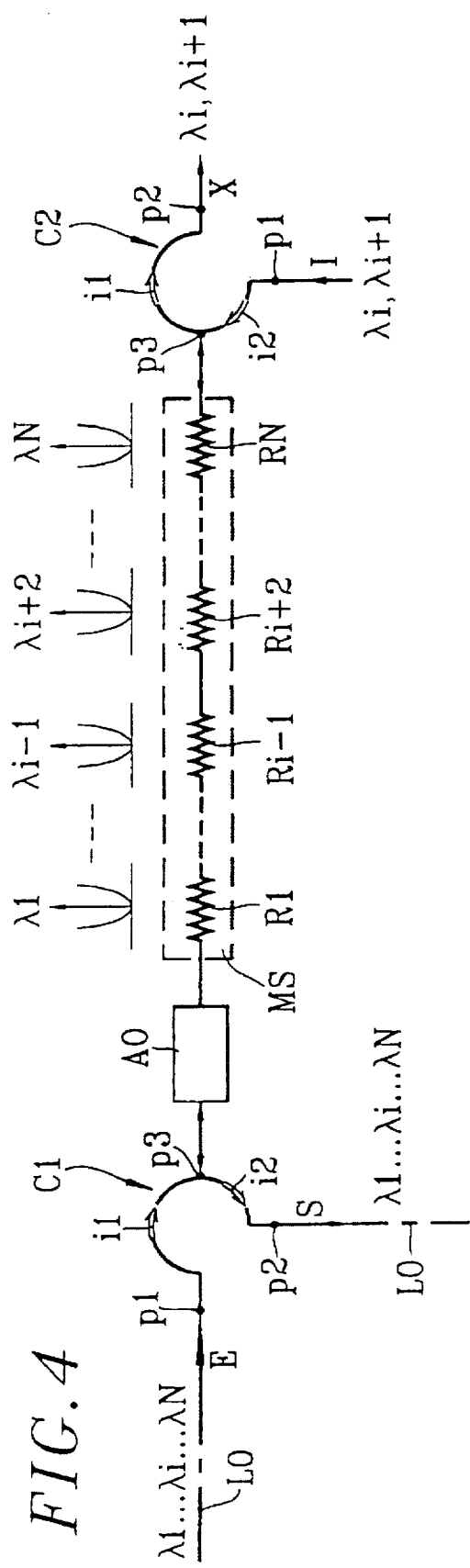

This is diagrammatically illustrated in FIG. 4 showing a multiplexer according to the invention identical to that of FIG. 2, except for the selection means which, in the case of FIG. 4, only comprises the gratings Ri ... Ri–1, Ri+2, ... RN, which are connected in series and permanently remain in their first state (there is no control means MC). This multiplexer of FIG. 4 makes it possible to add and/or drop signals of wavelengths λi and λi+1.

FIG. 5 diagrammatically illustrates another special embodiment of the multiplexer according to the invention having an optical circulator C4 with four successive ports p1, p2, p3 and p4, which are separated from one another by three optical isolators i1, i2, i3.

The multiplexer of FIG. 5 also comprises a selection means MS formed from a first array and a second array of photoinduced Bragg gratings. These arrays are identical and each comprises the N–1 gratings R1 ... Ri–1, Ri+1, ..... RN referred to hereinbefore, which are connected in series and remain in their first state.

The grating R1 of the first array is connected to port 2 of circulator C4, preferably via an optical amplifying medium AO. The free end of the grating RN of said first array constitutes the drop output X of the multiplexer.

The grating R2 of the second array is connected to port p3 of circulator C4, preferably via an optical amplifying medium AO. The free end of the grating RN of said second array forms the add input of the multiplexer.

Port p1 of the circulator corresponds to input E of the multiplexer and receives signals of respective wavelengths λ1 ... , λi, ... , λN. The signal of wavelength λi is dropped at X. At I, it is possible to add a signal of wavelength λi. Port p4 of the circulator corresponds to the multiplexer output S and supplies the non-dropped signals of wavelengths λ1 .. .. , λi–1, λi+1, ..... λN and the added signal of wavelength λi.

In the case where the amplifying media AO are used, the optical isolation of said media is obtained, on one side, by the isolators of the circulator C4 and, on the other side, by optical isolators i4 and i5 respectively placed at the drop output X and the add input I, as can be seen in FIG. 5.

More generally, the first array can comprise one or a plurality of fixed gratings and the second array can comprise said fixed grating or gratings. It is then possible to drop and/or add the wavelengths not reflected by said grating or gratings.

Obviously, in a multilexer according to FIG. 5, it would be possible to associated with the gratings a control means like means MC referred to hereinbefore in order to selectively place these gratings in their second state.

In the invention, the use of one or two optical amplifying means makes it possible to obtain an optical add-drop multiplexer "with gain", i.e. where the amplification function is integrated, so that the equipment is less expensive than an optical add-drop multiplexer to which would be added one or more optical amplifiers.

We claim:

1. Optical add-drop multiplexer, which serves to add to a group of optical signals, whose wavelengths belong to a group of N wavelengths (λ1 ... λN), where N>1, and drop from said group of signals at least one optical signal having a given wavelength, chosen from within the wavelength group, said multiplexer being characterized in that it comprises:

a first optical circulator (C1) having an input (p1) for receiving the group of signals and an output (p2), a second optical circulator (C2) having an input (p1) for receiving the signal to be added to the group of signals and an output (p2), an optical selection means (MS) coupled, on one side, to the first circulator and, on the other side, to the second circulator and which comprises at least one photoinduced Bragg grating (R1 ... RN) which is associated with the given wavelength and can be in a first state, where it reflects the signal having said given wavelength and where it transmits the signals having a wavelength different from the latter, or optionally in a second state, where it transmits all the signals and a means (MC) for controlling said selection means (MS) for placing the grating in the second state, the selection means cooperating with each optical circulator for adding and dropping the optical signal or signals, the output of the second circulator supplying the group of signals in which has been added or from which has been dropped the signal having the given wavelength and the output of the first circulator suplying the signal dropped from said group of signals when the grating is in the first state and conversely when the grating is in the second state.

2. Multiplexer according to claim 1, characterized in that an optical isolator is provided between the second and third ports and corresponding Bragg gratings in the two arrays can be controlled to transmit the wavelength to be dropped and added such that an end of the first array opposite the second port is an output of the signal to be dropped and an end of the second array opposite the third port is an input of the signal to be added.

3. Multiplexer according to claim 1, characterized in that the optical selection means (MS) comprises a plurality of photoinduced Bragg gratings (R1 ... RN), which are connected in series and in that the control means (MC) is able to place each of these gratings in the second corresponding state.

4. Multiplexer according to claim 3, characterized in that the photoinduced Bragg gratings (R1 ... RN) of the optical selection means (MS) are respectively associated with the wavelengths (λ1 ... λN) of the wavelength group.

5. Multiplexer according to claim 4, characterized in that at least one of the photoinduced Bragg gratings (R1 ... RN) is placed in the second corresponding state, whilst each of the other gratings is placed in the first corresponding state.

6. Multiplexer according to claim 5, characterized in that it also comprises at least one optical amplifying medium (AO), which is placed between the optical selection means (MS) and the first circulator (C1).

7. Multiplexer according to claim 4, characterized in that at least one of the photoinduced Bragg gratings (R1 ... RN) is placed in the first corresponding state, whilst each of the other gratings is placed in the second corresponding state.

8. Multiplexer according to claim 1, characterized in that the optical selection means comprises a plurality of photoinduced Bragg gratings, which are connected in series and each of which is in the first state.

9. Multiplexer according to claim 1, characterized in that it also comprises at least one optical amplifying medium (AO), which is placed between the optical selection means (MS) and one of the first and second circulators (C1, C2).

10. Multiplexer according to claim 9, characterized in that it comprises two optical amplifying media respectively placed between the optical selection means (MS) and the first and second circularors (C1, C2).

11. Multiplexer according to claim 2, characterized in that each of the first and second optical circularors (C1, C2) comprises a first optical isolator (i1) and a second optical isolator (i2), the input of the first isolator (i1) and the output of the second isolator (i2) being respectively coupled to the input (p1) and to the output (p2) of the corresponding circulator, whilst the output of the first isolator and the input of the second isolator are coupled to the optical selection means (MS).

12. Multiplexer according to claim 1, characterized in that the input (p3) of the second circulator (C2) receives the signal having said given wavelength which has been added to the group of signals.

13. Optical add-drop multiplexer, which serves to add to a group of optical signals, whose wavelengths belong to a group of N wavelengths ($\lambda 1 \ldots \lambda N$), where N>1, and drop from said group of signals at least one optical signal having a given wavelength, chosen from within the wavelength group, said multiplexer being characterized in that it comprises:

at least one optical circulator (C4) having an input (p1) for receiving the group of signals and an output (p4), an optical selection means (MS) coupled, on one side, to the circulator and which comprises at least one photoinduced Bragg grating (R1 ... RN) which is associated with the given wavelength and can be in a first state, where it reflects the signal having said given wavelength and where it transmits the signals having a wavelength different from the latter, or optionally in a second state, where it transmits all the signals and a means (MC) for controlling said selection means (MS) for placing the grating in the second state, the selection means cooperating with each optical circulator for adding and dropping the optical signal or signals, characterized in that the circulator (C4) has four ports, the first and fourth ports repectively forming the input and output of the the circulator, the second and third ports being coupled to the optical selection means (MS), the latter having a first array of M photoinduced Bragg gratings connected in series and respectively associated with different wavelengths from the wavelength group, said first array being coupled to the second port, with $1 \leq M < N$, and a second array, identical to the first array and coupled to the third port.

14. Multiplexer according to claim 13, characterized in that it also comprises at least one optical amplifying medium (AO) connected in series with at least one of the first and second arrays.

15. Multiplexer according to claim 14, characterized in that each of the first and second arrays is connected in series with at least one optical amplifying medium (AO).

16. Multiplexer according to claim 13, characterized in that each grating is in its first state.

17. Multiplexer according to claim 13, characterized in that it comprises the control means making it possible to place each grating in its second state.

18. Multiplexer according to claim 13, characterized in that M is equal to N−1.

* * * * *

UNITED STATES PATENT AND TRADEMARK OFFICE
CERTIFICATE OF CORRECTION

PATENT NO. : 5,726,785
DATED : March 10, 1998
INVENTOR(S) : Chawki et al.

It is certified that error appears in the above-identified patent and that said Letters Patent is hereby corrected as shown below:

In Section [75] Inventors:, delete "Pourilliau" and
    insert --Ploumilliau--.

In Section [56] References Cited, please add the following references which were considered by the examiner on 12/21/96:
    U.S. PATENT DOCUMENTS:
    4,693,544   9/1987    Yamasaki et al.
    4,973,124  11/1987    Kaede
    5,283,686   2/1994    Huber
    FOREIGN PATENT DOCUMENTS:
    2,537,733   6/1984    France
    2,565,442  12/1985    France
    OTHER PUBLICATIONS:
    U.S. Serial No. 08/609,519, Filed March 1, 1996,
    Entitled: HIGH ISOLATION, OPTICAL ADD-DROP MULTIPLEXER,
    Hamel et al.
    MICROWAVE AND OPTICAL TECHNOLOGY LETTERS, Vol. 7, No.
    11, 5 August 1994, pgs. 499-500, J. Capmany et al., "A
    NOVEL HIGHLY SELECTIVE AND TUNABLE OPTICAL BANDPASS
    FILTER USING A FIBER GRATING AND A FIBER
    FABRY-PEROT".
    EUROPEAN CONFERENCE ON OPTICAL COMMUNICATION (ECOC 93),
    Vol. 3, 12 September 1993, Montreux, Switzerland, pgs.
    29-32, F. Bilodeau et al., "COMPACT ALL-FIBER
    NARROWBAND TRANSMISSION FILTER USING BRAGG GRATINGS".

Column 8, line 20, delete "claim 1", and insert
    --claim 13--.

Signed and Sealed this

Sixth Day of October, 1998

*Attest:*

BRUCE LEHMAN

*Attesting Officer*     Commissioner of Patents and Trademarks